(12) United States Patent
Lee

(10) Patent No.: US 9,302,631 B2
(45) Date of Patent: Apr. 5, 2016

(54) METHOD FOR RETAINING AUTOMOTIVE TRIM PANEL TO INNER PANEL

(71) Applicant: Ford Global Technologies, LLC, Dearborn, MI (US)

(72) Inventor: Yun Shin Lee, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 14/186,565

(22) Filed: Feb. 21, 2014

(65) Prior Publication Data

US 2014/0165362 A1 Jun. 19, 2014

Related U.S. Application Data

(62) Division of application No. 13/071,000, filed on Mar. 24, 2011, now Pat. No. 8,677,573.

(51) Int. Cl.
| | |
|---|---|
| *B60R 13/02* | (2006.01) |
| *F16B 21/07* | (2006.01) |
| *F16B 21/08* | (2006.01) |
| *B21D 53/88* | (2006.01) |
| *F16B 5/06* | (2006.01) |

(52) U.S. Cl.
CPC .............. *B60R 13/02* (2013.01); *B60R 13/0206* (2013.01); *F16B 21/076* (2013.01); *F16B 21/086* (2013.01); *B21D 53/88* (2013.01); *F16B 5/065* (2013.01); *Y10T 24/30* (2015.01); *Y10T 24/309* (2015.01); *Y10T 24/44026* (2015.01); *Y10T 24/45204* (2015.01); *Y10T 29/49826* (2015.01); *Y10T 29/49947* (2015.01)

(58) Field of Classification Search
CPC .. B21D 53/88; B21D 53/36; Y10T 29/49876; Y10T 29/49948; Y10T 24/44026; Y10T 24/309; B60R 13/0206; F16B 21/076
See application file for complete search history.

(56) References Cited

U.S. PATENT DOCUMENTS

| | | |
|---|---|---|
| 4,176,428 A | 12/1979 | Kimura |
| 4,405,272 A | 9/1983 | Wollar |

(Continued)

FOREIGN PATENT DOCUMENTS

| | | | | |
|---|---|---|---|---|
| WO | WO 2007013283 A1 * | 2/2007 | .......... | B60R 13/0206 |
| WO | 2010016982 | 2/2010 | | |

OTHER PUBLICATIONS

Jetpress, Removable U-Type Cable Clips, http://wwwjetpress.com/Products.aspx/14249/CableAndPipeClips/UType, Sep. 28, 2010, 2 pages.

*Primary Examiner* — Jermie Cozart
(74) *Attorney, Agent, or Firm* — Vichit Chea; Price Heneveld LLP

(57) ABSTRACT

A serviceable safety clip for retaining an automotive trim panel to an inner panel. The serviceable safety clip includes a pin secured to the trim panel, wherein the pin includes a plurality of blades that each include a low retention detent and a high retention detent. The serviceable safety clip also includes a receiver that is secured to the inner panel, wherein the receiver includes an angled face to facilitate insertion of the pin detents and a holding face that retains the pin detents. Insertion of the blades into the receiver includes pushing the pin to flex the blades inward and thereby move the high retention detent beyond the holding face and pushing the pin further to again flex the blades inward and to move the low retention detent into engagement with the holding face.

18 Claims, 4 Drawing Sheets

(56) References Cited

U.S. PATENT DOCUMENTS

| | | |
|---|---|---|
| 4,648,766 A | 3/1987 | Wollar |
| 4,861,208 A | 8/1989 | Boundy |
| 5,507,610 A | 4/1996 | Benedetti et al. |
| 5,775,860 A | 7/1998 | Meyer |
| 6,003,928 A | 12/1999 | Curtindale |
| 6,196,607 B1 | 3/2001 | Gulisano |
| 6,196,756 B1 | 3/2001 | Leverger |
| 6,264,393 B1 | 7/2001 | Kraus |
| 6,594,870 B1 | 7/2003 | Lambrecht et al. |
| 6,612,795 B2 | 9/2003 | Kirchen |
| 6,769,849 B2 | 8/2004 | Yoneoka |
| 6,874,983 B2 | 4/2005 | Moerke |
| 7,178,855 B2 | 2/2007 | Catron et al. |
| 7,198,315 B2 | 4/2007 | Cass et al. |
| 7,351,023 B2 | 4/2008 | Scroggie et al. |
| 7,549,199 B2 | 6/2009 | Bügner |
| 7,559,599 B2 | 7/2009 | Kaplanov |
| 7,614,836 B2 | 11/2009 | Mohiuddin et al. |
| 7,677,850 B2 | 3/2010 | Sano |
| 7,690,876 B2 | 4/2010 | Kawai et al. |
| 2002/0021950 A1 | 2/2002 | Ichikawa |
| 2003/0190965 A1 | 10/2003 | Kirchen et al. |
| 2004/0074056 A1 | 4/2004 | Götzinger |
| 2005/0023686 A1 | 2/2005 | Lin |
| 2005/0236861 A1 | 10/2005 | Slobodecki et al. |
| 2006/0032031 A1* | 2/2006 | Banno ............ F16B 21/088 24/292 |
| 2006/0197356 A1 | 9/2006 | Catron et al. |
| 2008/0014045 A1 | 1/2008 | Kawai |
| 2008/0023686 A1 | 1/2008 | Noh et al. |
| 2008/0028577 A1 | 2/2008 | Soman et al. |
| 2008/0066266 A1 | 3/2008 | Scroggie et al. |
| 2010/0072735 A1 | 3/2010 | Kirchen et al. |

* cited by examiner

METHOD FOR RETAINING AUTOMOTIVE TRIM PANEL TO INNER PANEL

CROSS-REFERENCE TO RELATED APPLICATION

This application is a divisional of U.S. patent application Ser. No. 13/071,000, filed on Mar. 24, 2011, now U.S. Pat. No. 8,677,573, entitled "TWO STAGE SERVICEABLE SAFETY CLIP." The aforementioned related application is hereby incorporated by reference.

FIELD OF THE INVENTION

The present invention generally relates to a trim panel attachment assembly, and more particularly relates to a two stage safety clip and a corresponding method of assembly.

BACKGROUND OF THE INVENTION

Automotive vehicles typically include decorative trim panel pieces secured to inner panels in a variety of ways. Such trim panels must meet installation and removal standards for service, while also meeting standards pertaining to retention in the event of an impact. Often, screws or other mechanical fasteners are employed to secure the trim panel to the inner panel, however, visible screws or fasteners are not desirable from an aesthetics standpoint. Other trim panels are secured to the inner panel by hidden fasteners, however, these do not ensure retention forces sufficient to completely retain the trim panel in the event of an impact.

Accordingly, an apparatus and method are desired having the aforementioned advantages and solving and/or making improvements on the aforementioned disadvantages.

SUMMARY OF THE INVENTION

According to one aspect of the present invention, a method for retaining an automotive trim panel to an inner panel includes providing a pin having a head secured to the trim panel and a plurality of blades extending from the head that includes a high retention detent and a low retention detent. The method further includes providing a receiver secured to the inner panel that includes a holding face. The method also includes inserting the blades into the receiver to flex the blades inward and to position the high retention detent beyond the holding face. Further, the method includes pushing the pin further into the receiver to flex the blades inward and to position the low retention detent beyond the holding face.

According to another aspect of the present invention, a method for retaining an automotive trim piece to a structure includes providing a pin secured to the trim piece that has blades on opposing side of a gap, each including high and low retention detents. The method also includes providing a receiver secured to the structure that includes a holding face. Further, the method includes inserting the blades into the receiver to flex the blades into the gap and position the high and low retention detents sequentially beyond the holding face.

According to yet another aspect of the present invention, a method for retaining an automotive trim piece to a structure includes providing a pin having a head secured to the trim piece and a plurality of blades extending from the head that includes high and low retention detents. The method also includes providing a receiver secured to the structure that includes an opening with a holding face on a perimeter thereof. Further, the method provides inserting the high and low retention detents into the opening and sequentially beyond the holding face.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
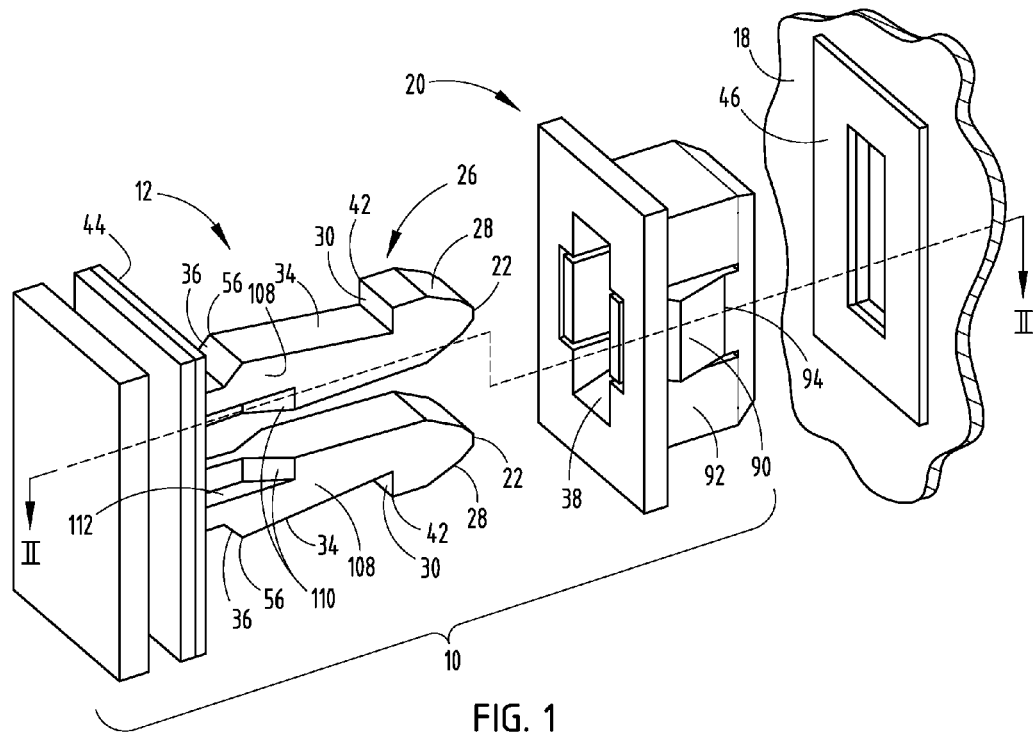
FIG. 1 is a top, left perspective view of a serviceable safety clip for retaining an automotive trim panel to an inner panel.
Figure 1A:
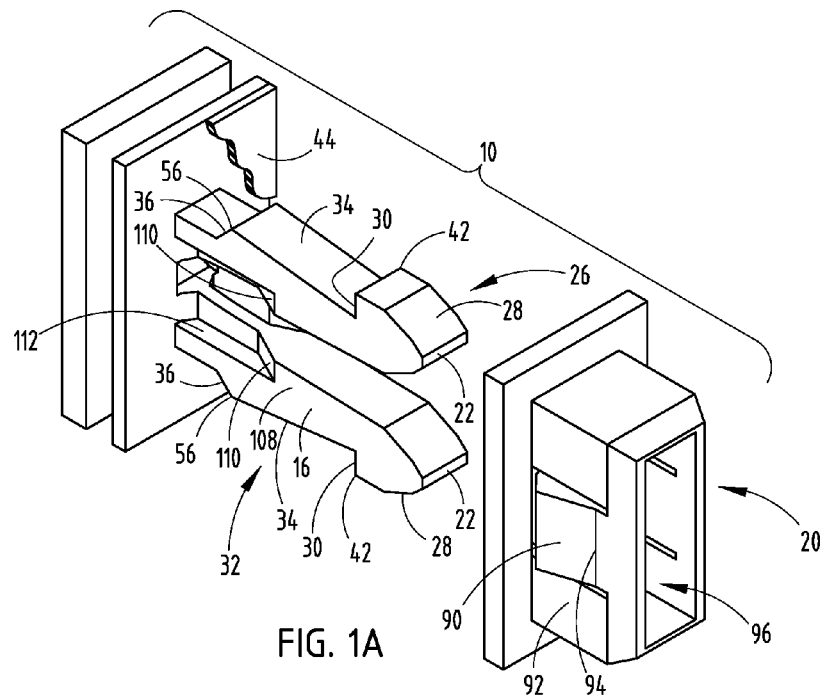
FIG. 1A is a top, right perspective view of the serviceable safety clip for retaining the automotive trim panel to the inner panel.
Figure 2:
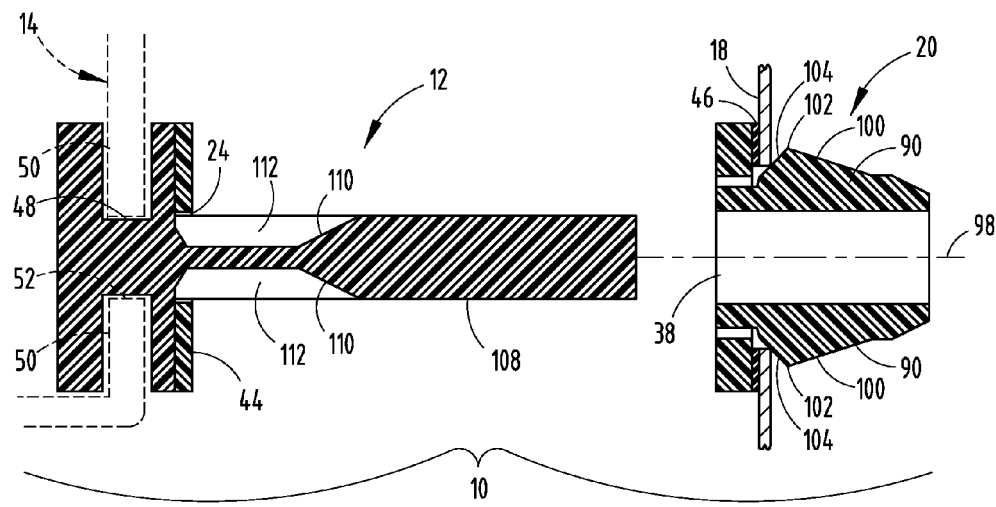
FIG. 2 is a top, cross-sectional view of the serviceable safety clip taken along line 2-2 of FIG. 1.
Figure 3:
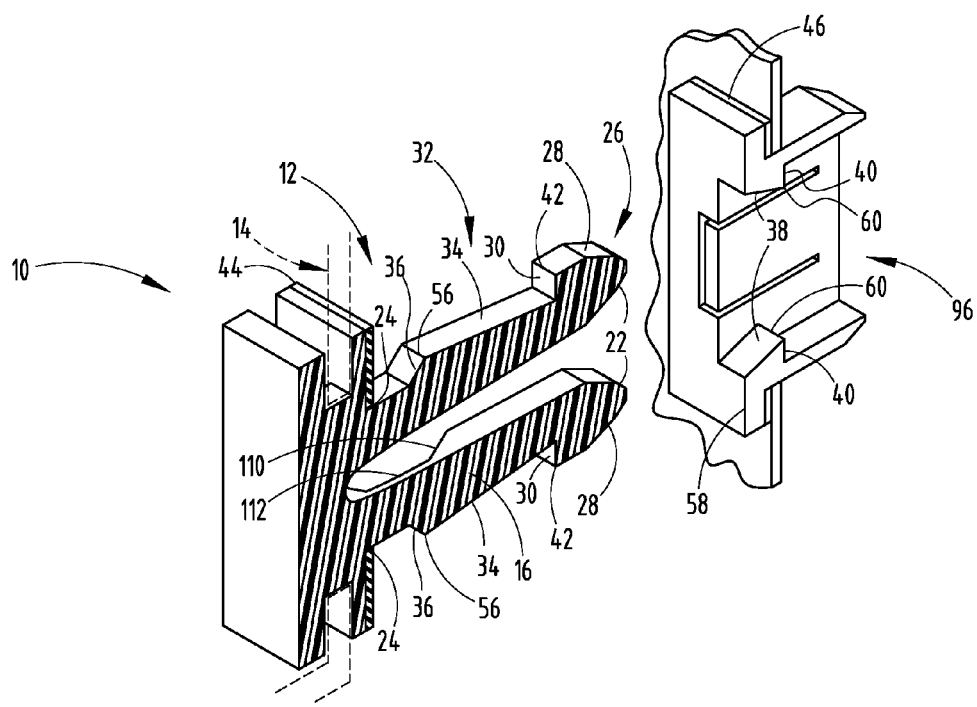
FIG. 3 is a perspective, cross-sectional view of the serviceable safety clip.
Figure 4:
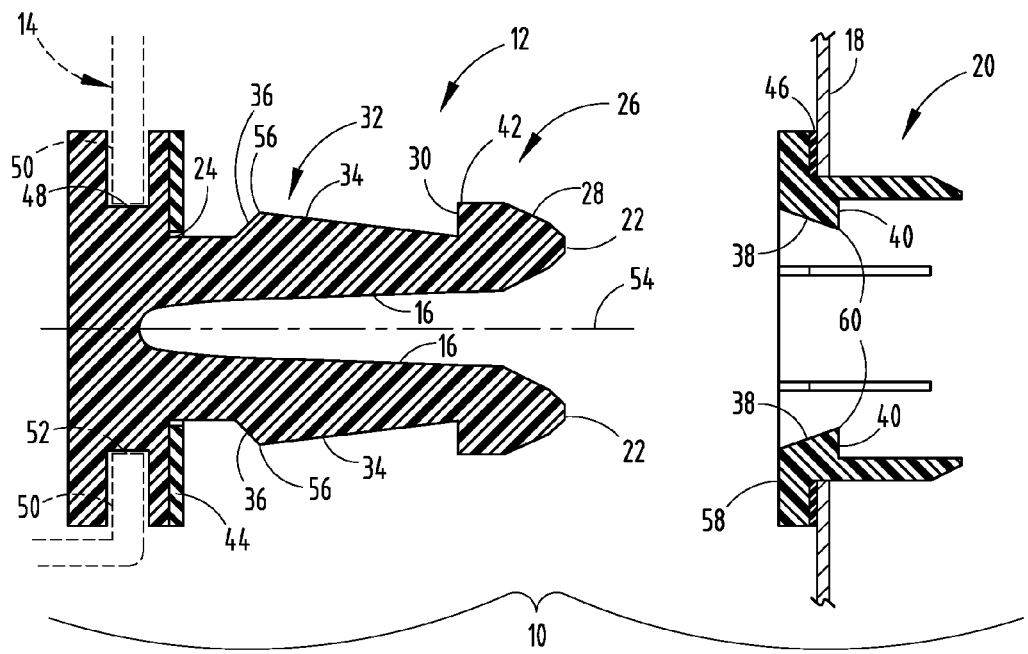
FIG. 4 is a front, cross-sectional view of the serviceable safety clip.

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

The reference numeral 10 (FIGS. 1-7) generally designates a two stage serviceable safety clip for retaining an automotive trim panel 14 to an inner panel 18, such as an automotive door panel. In the illustrated example, the two stage serviceable safety clip 10 comprises a pin 12 secured to the trim panel 14, where the pin 12 includes at least one blade 16. Each blade 16 comprises a first end 22 and a second end 24. Each blade 16 also comprises a high retention detent 26 that includes a first angled face portion 28 located proximate the first end 22 of the blade 16 and a first dropoff face 30 proximate an end point 42 of the angled face portion 28. Each blade 16 also comprises a low retention detent 32 that includes a second angled face portion 34 and a second dropoff face 36, where the low retention detent 32 is located between the first dropoff face 30 and the second end 24 of the blade 16. The serviceable safety clip 10 also comprises a receiver 20 secured to the inner panel 18, where the receiver 20 includes an angled face 38 to facilitate insertion of the pin detents 26, 32 and a holding face 40 that retains the first and second dropoff faces 30, 36 of the pin detents 26, 32.

The illustrated serviceable safety clip assembly 10 may be a molded plastic clip comprising two main parts, specifically the two stage pin 12 and the receiver 20. The pin 12 includes at least one blade 16, and typically two blades 16, that extend substantially parallel to one another in a longitudinal direction. The pin 12 also includes a base section 48 or a head from which the blades 16 extend in a substantially perpendicular direction. The base section 48 is configured to securely attach to the trim panel piece 14 in any number of ways. In the illustrated examples shown in FIGS. 1-3, the trim panel piece 14 includes a dog house portion 50 that may be snap-fitted into slots 52 of the molded pin 12. Alternatively, the secure attachment between the trim panel piece 14 and the pin 12 may be accomplished by employing mechanical fasteners or an adhesive.

The blades 16 of the pin 12 include the first end 22 located at the distal end of the base section 48. The blades 16 terminate at the second end 24 located adjacent to the base 48. The high retention detent 26 of each blade 16 is located proximate the first end 22 of each blade 16 and comprises the first angled face portion 28 and the first dropoff face 30. The first angled face portion 28 begins at the first end 22 and extends either linearly or in a slightly curved manner away from the first end 22 toward the second end 24 of the blade 16, while also extending outwardly away from an imaginary longitudinal centerline 54. The first angled face portion 28 terminates at the end point 42, then transitions into the first dropoff face 30. The first dropoff face 30 extends from the end point 42 at a steep angle substantially perpendicular to, and toward, the longitudinal centerline 54.

Additionally, each blade 16 includes a necked region proximate the second end 24. Tapering inward from a sidewall 108 of the blade 16 is an angled face 110 that forms a channel 112.

Each blade 16 also includes the low retention detent 32 located at a position between the first dropoff face 30 and the second end 24 of each blade 16. The low retention detent 32 includes the second angled face portion 34 that extends either linearly or in a slightly curved manner away from the first end 22 and toward the second end 24, while also extending outwardly from the longitudinal centerline 54. The second angled face portion 34 may have a similar configuration and/or angle incline as that of the first angled face portion 28. Alternatively, the second angled face portion 34 may take on a distinct geometric configuration and/or angle of incline as that of the first angled face portion 28. The second angled face portion 34 terminates at a point 56, thereby transitioning into the second dropoff face 36. The second dropoff face 36 extends from point 56 inwardly towards the longitudinal centerline 54 and towards the second end 24 of the blade 16. The angle of the second dropoff face 36 is not as steep as that of the first dropoff face 30. Each blade 16 is flexibly biased to maintain an at rest position, that being substantially parallel to the other blades 16, as well as substantially perpendicular to the base 48 of the pin 12.

The receiver 20 of the overall clip assembly 10 is installed into a sheet metal hole of the inner panel 18. The receiver 20 includes at least one, but typically a plurality of flexible fins 90 that are located proximate sidewalls 92 of the receiver 20. The flexible fins 90 are flexibly hinged at point 94 to the receiver 20. A corresponding void 96 in the receiver 20 allows the flexible fins 90 to rotate or flex inwardly towards a longitudinal centerline 98 of the receiver 20. Each flexible fin 90 includes a first angled face 100 that extends from the point 94 where the flexible fin 90 is hingeably attached and terminates at point 102, while also extending radially outward from the longitudinal centerline 98 of the receiver 20. At point 102, the first angled face 100 transitions to a second angled face 104. The second angled face 104 extends from the point 102 radially inward toward the longitudinal centerline 98 of the receiver 20. In the illustrated example, both the first and second angled faces 100,104 comprise substantially linear paths, however, the first and second angled faces 100, 104 may comprise a slightly curved geometry. The second angled face 104 terminates proximate seal 46 and it is this small space between the flexible fin 90 and the seal 46 that the inner panel 18 will reside between when the clip assembly 10 is fully inserted into an aperture of the inner panel 18.

After the clip assembly 10 initially penetrates the inner panel 18, the flexible fins 90 eventually engage the inner panel 18. Specifically, the inner panel 18 engages the first angled face 100 of the flexible fin 90, thereby depressing each fin 90 into the corresponding channel 112 of the pin blade 16 by rotating each fin 90 about hinge point 94. Further insertion of the clip assembly 10 continues the process of the inner panel 18 gliding along the first angled face 100 of the flexible fin 90 until the flexible fin 90 bypasses the aperture of the inner panel 18. Full insertion of the clip assembly 10 is reached when the seal 46 engages the receiver 20, as well as when the flexible fins 90 rotate outwardly away from the longitudinal centerline 98. The outward flexing of the fins 90 occurs due to a biasing force that is applied approximate hinge point 94.

In the position where the receiver 20 is fully inserted into the inner panel 18 (FIG. 2), the inner panel 18 is engaged, or very nearly in contact with, the second angled face 104 of the flexible fin 90. In this fully inserted position, the trim panel 14 is securely engaged to the inner panel 18 and this constitutes a static position. From this static position, the trim panel 14 may optionally be removed from the inner panel 18 for service or replacement. To accomplish removal, sufficient force must be applied to withdraw the clip assembly 10, specifically overcoming the hinge force of the flexible fins 90. Sufficient pulling force will cause the inner panel 18 to slide along the second angled face 104, thereby depressing each fin 90 into the corresponding channel 112 until the clip assembly 10 may be fully withdrawn.

The receiver 20 includes an exterior face 58 that may be exposed to an exterior region of the inner panel 18. The receiver 20 also includes an angled face 38 that extends from the exterior face 58 into the interior region of the inner panel 18, as well as inwardly toward the longitudinal centerline 54. The angled face 38 terminates at a point 60 and transitions into a holding face 40 that extends outwardly from the longitudinal centerline 54 in a substantially perpendicular direction.

Although the illustrated drawings depict the pin 12 being inserted into the receiver 20 subsequent to insertion of the receiver 20 into the inner panel 18, it is also conceived that the pin 12 would be inserted into the receiver 20 prior to insertion of the then assembled two stage serviceable safety clip 10 into the inner panel 18. A single unit installation step such as this would be advantageous to installation operators who are accustomed to installing a single unit.

Figure 5:
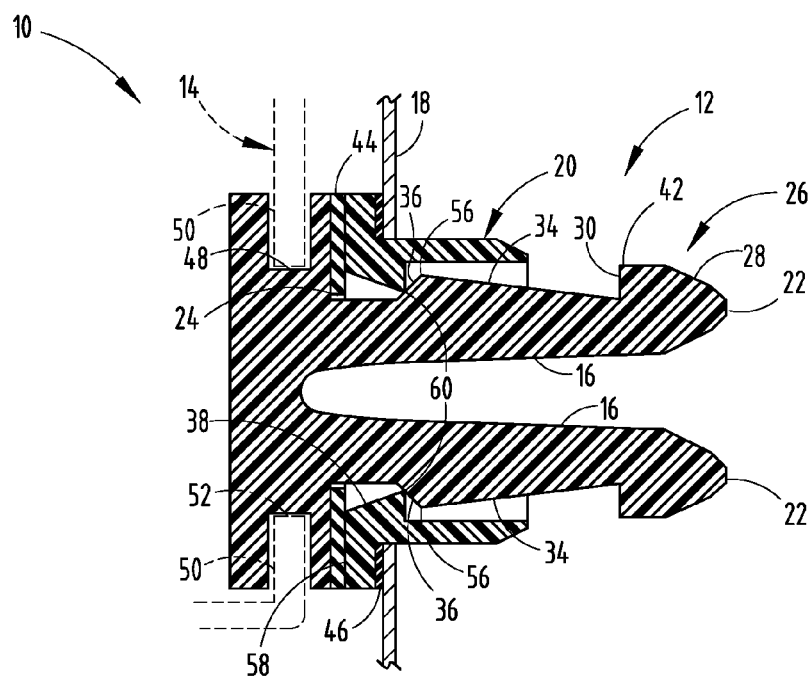
FIG. 5 is a front, cross-sectional view of the serviceable safety clip fully inserted into an aperture of an inner panel.

Full insertion (FIG. 4) of the pin 12 into the receiver 20 is facilitated by the cooperation of the first angled face and the second angled face portions 28, 34 with the angled face 38 of the receiver 20. The angles allow a smooth insertion of the pin 12 into the receiver 20, thereby bringing the trim panel piece 14 into a position proximate the inner panel 18. Foam seals 44, 46 are included on one or both the receiver 20 and the pin 12 to achieve sealing between the relevant components. In the illustrated example, the second dropoff face 36 of the low retention detent 32 provides a resistive force to extraction of the pin 12 from the receiver 20. The exact angle and configuration of the low retention detent 32 may be optimized to provide various retention forces. The retention force prevents withdrawal of the pin 12 from the receiver 20 to counteract forces that would otherwise dislodge the pin 12 from the receiver 20. One example of such an external force is an automobile collision. In the event an external force overcomes the retention force provided by the low retention detent 32, the high retention detent 26 is provided to ensure that the pin 12 is not completely removed from the receiver 20. This is successfully accomplished by the steep angle of the first dropoff face 30 and the holding face 40, as well as each blade 16 being flexibly biased to maintain a position substantially parallel to one another. By negating relatively easy flexure of the blades 16, the pin 12 cannot be completely withdrawn from the receiver 20 based on the first dropoff face 30 engaging the holding face 40 of the receiver 20. This position is illustrated in FIG. 5.

To avoid withdrawal of the receiver 20, and thereby the trim panel 14, when undergoing a significant external force such as an automobile collision, the clip assembly 10 is capable of transitioning to an impact position. The impact position is defined by a repositioning of the pin 12 to a position where the pin 12 overcomes the low retention detent 32 and slides to a position where the sidewalls 108 block inward flexing of the fins 90, thereby preventing the receiver 20 from pulling away from the inner panel 18. By blocking the ability of the fins 90 to rotate, the overall clip assembly 10 is effectively locked in place, thereby preventing the pin 12 and trim panel 14 from disengaging the inner panel 18.

Figure 6:
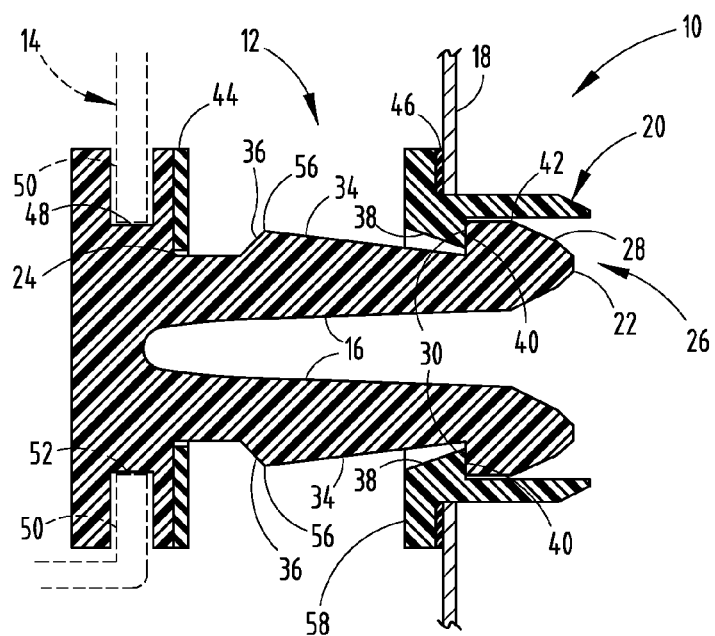
FIG. 6 is a front, cross-sectional view of the serviceable safety clip partially inserted into the inner panel.
Figure 7:
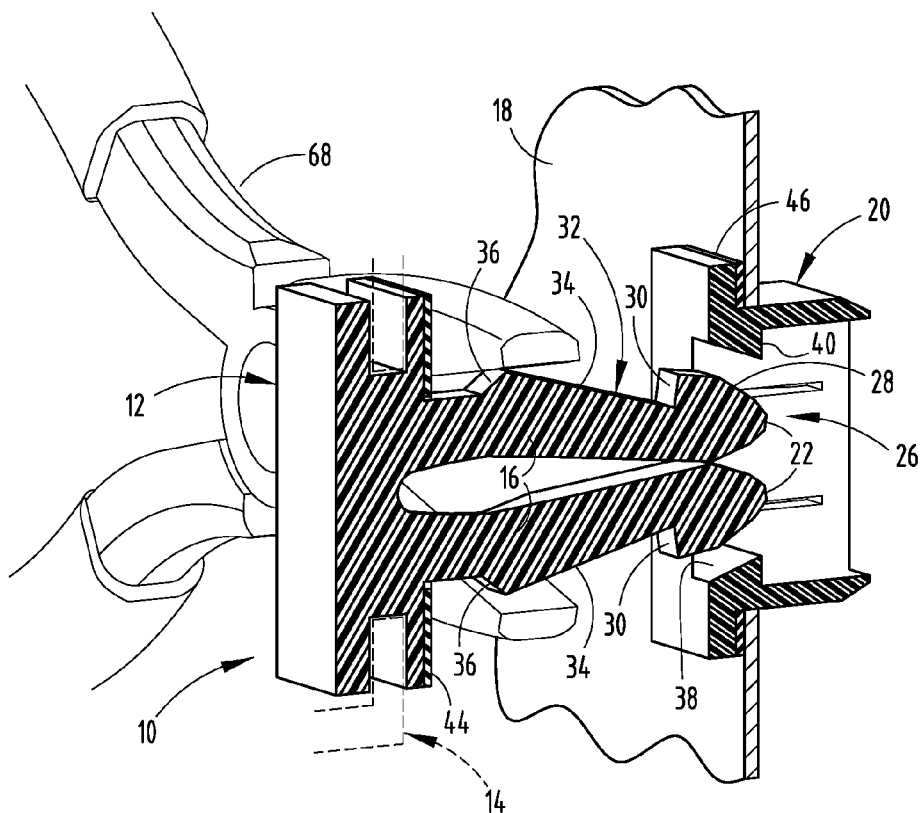
FIG. 7 is a perspective, cross-sectional view of the serviceable safety clip being removed from the inner panel.

In the event the trim panel piece 14 or the inner panel 18 require service, the pin 12, and thereby the trim panel piece 14, may be completely withdrawn from the receiver 20 (FIG. 6). By manually pulling the pin 12 away from the receiver 20, with sufficient force to overcome the low retention detent 32, a space between the base 48 of the pin 12 and the inner panel 18 is created. Within this space, either fingers or a tool 68 (FIG. 7) may be inserted to clamp down with sufficient force to overcome the flexible biasing of the blades 16. Clamping down with such a force deflects the blades 16 inwardly toward the longitudinal centerline 54, thereby disengaging the first dropoff face 30 and the holding face 40 which allows the pin 12 to be withdrawn from the receiver 20.

It addition to having the ability to withdraw the pin 12 from the receiver 20, the receiver 20 may be withdrawn from the inner panel 18 by simply pulling the receiver 20 away from the inner panel 18 when the fins 90 are not impeded from flexing inward. This is possible when the pin 12 is withdrawn from the receiver 20 or when the pin 12 is in the static position, that being when the channel 112 is lined up to receive inwardly flexing fins 90 during withdrawal of the receiver 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method for retaining an automotive trim panel to an inner panel, comprising:
    providing a pin having a head secured to the trim panel and a plurality of blades extending from the head that includes a low retention detent and a high retention detent having a first angled face portion located proximate a distal end of the plurality of blades and a first dropoff face proximate an end point of the first angled face portion;
    providing a receiver secured to the inner panel that includes a holding face;
    inserting the blades into the receiver to flex the blades inward and to position the high retention detent beyond the holding face; and
    pushing the pin further into the receiver to flex the blades inward and to position the low retention detent beyond the holding face.

2. The method of claim 1, further comprising:
    disengaging the low retention detent from the holding face by pulling the trim panel away from the inner panel, and thereby moving the high retention detent into engagement with the holding face, providing a space between the trim panel and the inner panel sufficient to insert a tool into the space.

3. The method of claim 2, further comprising:
    disengaging the high retention detent by inserting the tool into the space and squeezing the plurality of blades together and completely withdrawing the pin from the receiver.

4. The method of claim 1, wherein the receiver includes an angled face to facilitate flexing the plurality of blades toward each other upon insertion of the pin into the receiver.

5. The method of claim 1, wherein the plurality of blades are made of a resilient polymer, such that the blades are flexible inward for insertion and removal of the pin from the receiver.

6. The method of claim 1, wherein the pin includes at least one foam seal on the head proximate the plurality of blades for engaging the receiver.

7. The method of claim 1, wherein the low retention detent includes a second angled face portion and a second dropoff face, wherein the low retention detent is located between the first dropoff face and the head of the pin.

8. The method of claim 1, wherein the holding face of the receiver and the first dropoff face of the high retention detent are aligned and substantially parallel to a planar extent of the trim panel proximate the pin.

9. A method for retaining an automotive trim piece to a structure, comprising:
    providing a pin secured to the trim piece that has blades on opposing sides of a gap, each including high and low retention detents;
    providing a receiver secured to the structure that includes a holding face; and
    inserting the blades into the receiver to flex the blades into the gap and position the high and low retention detents sequentially beyond the holding face;
    wherein the high retention detent includes a first angled face portion located proximate a distal end of the blades and a first dropoff face proximate an end point of the first angled face portion, and wherein the low retention detent includes a second angled face portion and a second dropoff face, whereby the low retention detent is located between the first dropoff face and the head of the pin.

10. The method of claim 9, wherein inserting the blades into the receiver includes pushing the pin to flex the blades inward to move the high retention detent beyond the holding face and further pushing the pin to again flex the blades inward and to move the low retention detent beyond the holding face.

11. The method of claim 9, further comprising:
    disengaging the low retention detent from the holding face by pulling the trim piece away from the structure, and thereby moving the high retention detent into engagement with the holding face, which provides a space between the trim piece and the structure sufficient to insert a tool into the space.

12. The method of claim 11, further comprising:
disengaging the high retention detent by inserting the tool into the space and squeezing the blades together and completely withdrawing the pin from the receiver.

13. The method of claim 9, wherein the receiver includes an angled face to facilitate flexing the blades toward each other upon insertion of the pin into the receiver.

14. The method of claim 9, wherein the blades are made of a resiliently flexible polymer, such that the blades are flexible inward for insertion and removal of the pin from the receiver.

15. A method for retaining an automotive trim piece to a structure, comprising:
providing a pin having a head secured to the trim piece and a plurality of blades having a low retention detent and a high retention detent having a first angled face portion located proximate a distal end of the plurality of blades and a first dropoff face proximate an end point of the first angled face portion;
providing a receiver secured to the structure that includes an opening with a holding face; and
inserting the high and low retention detents into the opening to position the high retention detent beyond the holding face.

16. The method of claim 15, wherein inserting the high and low retention detents into the opening includes pushing the pin to flex the plurality of blades inward and thereby move the high retention detent beyond the holding face, and further includes pushing the pin to again flex the plurality of blades inward and thereby move the low retention detent into engagement with the holding face.

17. The method of claim 15, further comprising:
disengaging the low retention detent from the holding face by pulling the trim piece away from the structure, and thereby moving the high retention detent into engagement with the holding face, which provides a space between the trim piece and the structure sufficient to insert a tool into the space.

18. The method of claim 17, further comprising:
disengaging the high retention detent by inserting the tool into the space and squeezing the plurality of blades together and completely withdrawing the pin from the receiver.

* * * * *